UNITED STATES PATENT OFFICE.

FRANZ SCHOLL, OF HÖCHST-ON-THE-MAIN, GERMANY, ASSIGNOR TO THE FARBWERKE, VORMALS MEISTER, LUCIUS & BRÜNING, OF SAME PLACE.

YELLOW AZO DYE AND PROCESS OF MAKING SAME.

SPECIFICATION forming part of Letters Patent No. 656,859, dated August 28, 1900.

Application filed June 23, 1900. Serial No. 21,301. (Specimens.)

*To all whom it may concern:*

Be it known that I, FRANZ SCHOLL, Ph. D., a citizen of the Empire of Germany, residing at Höchst-on-the-Main, Germany, have invented certain new and useful Improvements in the Manufacture of Substantive Dyestuffs for Cotton Fast to Alkali, Acid, and Light, of which the following is a specification.

I have found that a very beautiful easily-soluble yellow dyestuff for cotton may be obtained with good yield by combining diazotized primulin with 1-para-sulfophenyl-3-methyl-5-pyrazolone. To manufacture this dyestuff, I employ the diazotized sulfonic acid of the primulin base obtained by heating para-toluidin with sulfur, on the one hand, and 1-para-sulfophenyl-3-methyl-5-pyrazolone, on the other hand.

Example: Seventy-five kilos of primulin-sulfonic acid and seven kilos of sodium nitrite are dissolved in one thousand liters of water. This solution is run while stirring into thirty-six kilos of hydrochloric acid (thirty per cent. strength) and about one hundred liters of water. After a few hours the diazo compound thus obtained is run into a solution of twenty-seven kilos of 1-para-sulfophenyl-3-methyl-5-pyrazolone and thirty kilos of sodium carbonate in about four hundred liters of water. The combination is soon completed. The dyestuff is salted out. The dyestuff thus obtained by combining one molecular proportion of diazotized primulin-sulfonic acid with one molecular proportion of 1-para-sulfophenyl-3-methyl-5-pyrazolone is an orange-yellow powder very easily soluble in cold water with a reddish-yellow color, becoming redder on addition of caustic alkali, soluble with difficulty in alcohol, and insoluble in benzene, petroleum, and ether. It separates from its aqueous solution on addition of mineral acids in the form of yellow flakes, is soluble in concentrated sulfuric acid with a light-yellow color, and dyes cotton in a neutral or alkaline bath yellow.

Having thus described my invention, I claim—

1. As a new product, the new yellow dyestuff obtained by combining one molecular proportion of diazotized primulinsulfonic acid with one molecular proportion of 1-para-sulfophenyl-3-methyl-5-pyrazolone, being an orange-yellow powder easily soluble in cold water with a reddish-yellow color, soluble with difficulty in alcohol, insoluble in benzene, petroleum and ether, separating from its aqueous solution on addition of mineral acids in the form of yellow flakes, and dyeing cotton in a neutral or alkaline bath yellow, substantially as set forth.

2. The herein-described process of manufacturing an azo dyestuff directly dyeing cotton yellow, which consists in allowing diazotized primulinsulfonic acid to act upon 1-para-sulfophenyl-3-methyl-5-pyrazolone, substantially as set forth.

In testimony that I claim the foregoing as my invention I have signed my name in presence of two subscribing witnesses.

FRANZ SCHOLL.

Witnesses:
HEINRICH HAHN,
ALFRED BRISBOIS.